US006169838B1

(12) United States Patent
He et al.

(10) Patent No.: US 6,169,838 B1
(45) Date of Patent: Jan. 2, 2001

(54) ATHERMAL WAVEGUIDE GRATING BASED DEVICE HAVING A TEMPERATURE COMPENSATOR IN THE SLAB WAVEGUIDE REGION

(76) Inventors: Jian-Jun He, 160 Preston Street, Ottawa, Ontario (CA), K1R 7P7; Emil S. Koteles, 485 Island Park Drive, Ottawa, Ontario (CA), K1Y 0B2

( * ) Notice: Under 35 U.S.C. 154(b), the term of this patent shall be extended for 0 days.

(21) Appl. No.: 09/330,137

(22) Filed: Jun. 11, 1999

Related U.S. Application Data

(63) Continuation-in-part of application No. 09/061,939, filed on Apr. 17, 1998, now Pat. No. 5,937,113.

(51) Int. Cl.[7] .............................. G02B 6/10; G02F 1/295
(52) U.S. Cl. ............................................. 385/129; 385/10
(58) Field of Search .................................. 385/11, 14, 31, 385/36, 37, 46, 10, 147, 129; 250/227.23; 372/20, 100, 102, 92; 359/333, 120, 344, 349, 136, 118

(56) References Cited

U.S. PATENT DOCUMENTS

| 5,206,920 | * | 4/1993 | Cremer et al. ........................ 385/37 |
| 5,600,472 | * | 2/1997 | Zirngibl ................................. 385/37 |
| 5,706,377 | * | 1/1998 | Li ........................................... 385/37 |
| 5,784,507 | * | 7/1998 | Holm-Kennedy et al. ............ 385/31 |
| 5,799,118 | * | 8/1998 | Ogusu et al. .......................... 385/14 |

OTHER PUBLICATIONS

G. Heise et al, "Optical phased array filter module with passively compensated temperature dependence", proceeding of the 24th European Conference on Optical Communication, 1998, pp. 319–320, 1998.

Y. Inoue et al, "Athermal silica–Based arrayed waveguide in grating demultiplexers", Electron. Lett. 33, pp. 1945–1946, 1997.

H. Tanobe et al, "Temperature insensitive arrayed waveguide gratings on InP substrates", OFC'97 Technical Digest, ThM4, pp. 298–299, 1997.

A. Kaneko et al, "Athermal silica–Based arrayed waveguide grating (AWG) multiplexers with new low loss groove design", Optical Fiber Communications Conference, 1999, Technical Digest, pp. 204–206, 1999.

* cited by examiner

*Primary Examiner*—Akm E. Ullah
(74) *Attorney, Agent, or Firm*—Juliusz Szereszewski

(57) ABSTRACT

A device for compensating the temperature sensitivity normally associated with an integrated optical waveguide grating device has a temperature compensating slab waveguide region. This compensating region is provided within the slab waveguide region normally present in the grating device by modifying a sub-region of a predetermined shape and dimension to change its temperature coefficient of refractive index. This method and device can be applied to reflective and transmissive diffraction gratings and to phased array waveguide gratings.

23 Claims, 6 Drawing Sheets

ATHERMAL WAVEGUIDE GRATING BASED DEVICE HAVING A TEMPERATURE COMPENSATOR IN THE SLAB WAVEGUIDE REGION

This application is a continuation-in-part of application Ser. No. 09/061,939 filed Apr. 17, 1998 now U.S. Pat. No. 5,937,113.

FIELD OF THE INVENTION

This invention relates generally to an integrated athermal optical waveguide grating device, and more particularly to a wavelength multi/demultiplexer exhibiting little or no temperature sensitivity, or alternatively to an optical device that has a controlled amount of temperature sensitivity.

BACKGROUND OF THE INVENTION

Integrated wavelength multi/demultiplexers are important components for wavelength division multiplexing (WDM) optical communication systems. Integration offers the advantages of compactness, reliability, and reduced packaging costs. Further, implementation in a semiconductor material, particularly the InGaAsP/InP system important for optical fiber communications systems, would permit monolithic integration of these passive devices with active ones, such as lasers, modulators, optical switches, and detectors, resulting in sophisticated wavelength sensitive photonic integrated circuits with complex functionalities.

Heretofore, one of the problems in an integrated wavelength multi/demultiplexer is the temperature sensitivity of the device. Since the waveguide material usually has a temperature dependent refractive index, the channel wavelengths of multi/demultiplexer shift as the temperature varies. This shift is typically of the order of 0.01 nm/° C. in silica based devices and 0.1 nm/° C. in InP based devices. This wavelength shift would result in a loss of signal or crosstalk in the communication system. As WDM systems are being designed towards smaller and smaller channel spacing (from 1.6 nm to 0.4 nm or even less in the future), even a small temperature dependent wavelength shift (e.g. <0.1 nm) is of concern.

To accommodate the temperature variation due to weather conditions in the field, the waveguide multi/demultiplexer is usually packaged in a sealed package with a thermo-electric temperature controller in order to keep the temperature, and thus the channel wavelengths, at fixed values. This significantly increases the packaging cost. As dense DWM systems are moving from merely long-haul point-to-point transmission systems applications to metropolitan or local area networks, the cost of the components becomes a predominant issue. It is therefore highly desirable that the multi/demultiplexing devices are temperature insensitive.

Two types of integrated wavelength multi/demultiplexers that have been widely investigated are phased waveguide arrays and etched reflecting diffraction gratings.

Diffraction grating based devices require high quality, deeply etched grating facets. The optical loss of the device depends critically on the verticality and smoothness of the grating facets. However, the size of the grating device is usually much smaller than the phased array and the spectral finesse is much higher due to the fact that the number of teeth in the grating is much larger than the number of waveguides in the phased array. This allows the grating based device to have a larger number of channels available over its free spectral range (FSR) and consequently can be scaled-up easily to high density operation.

In waveguide array based devices, several approaches have been used to compensate for the temperature sensitivity. In one design, the input waveguide is eliminated and light from the input optical fiber is coupled directly into the slab section. Then by mounting the fiber on a temperature sensitive rod, the temperature modified change in the position of the launched light is designed to compensate the change in wavelength of the channel due to the temperature variation of the refractive index of the waveguide material. This method is described by G. Heise, H. W. Schneider, and P. C. Clemens, in a paper entitled "Optical phased array filter module with passively compensated temperature dependence", Proceeding of the 24th European Conference on Optical Communication, 1998, pp. 319–320, 1998, In another technique, a triangularly shaped region is created in the arrayed waveguide section which is then filled with a material possessing negative thermal coefficient (e.g., silicone rubber in the case of silica waveguides). By proper design of this filled region, the temperature dependence of the total optical path (comprising both the normal waveguide sections and the portion with negative thermal effects), due to refractive index changes, can be made to approach zero. The application of this technique in silica based arrayed waveguide devices is described by Y. Inoue, A. Kaneko, F. Hanawa, H. Takahashi, K. Hattori, and S. Sumida, in a paper entitled "Athermal silica-Based arrayed waveguide grating demultiplexers", *Electron. Lett.* 33, PP. 1945–46, 1997. The same technique used in InP based arrayed waveguide grating is described by H. Tanobe, Y. Kondo, Y. Kadota, K. Okamoto, and Y. Yoshikuni, in a paper entitled "Temperature insensitive arrayed waveguide gratings on InP substrates", OFC'97 Technical Digest, ThM4, pp. 298–299, 1997.

These techniques have many disadvantages. The cantilevered fiber approach is inherently difficult to fabricate and adjust and is unreliable. A major problem of the second approach is that of insertion loss and fabrication complexity. By replacing a large section of the arrayed waveguide section with a slab containing the material with negative thermal index, lateral waveguiding is lost in this portion, increasing optical loss and crosstalk. Attempts to reduce these effects by breaking the triangular region into alternate waveguiding and compensator regions, as described by A. Kaneko, S. Kamei, Y. Inoue, H. Takahashi, and A. Sugita, in a paper entitled "Athermal silica-Based arrayed waveguide grating (AWG) multiplexers with new low loss groove design", Optical Fiber Communications Conference, 1999, Technical Digest, pp. 204–206, 1999, can decrease loss but at the expense of design and fabrication complexity.

It is an object of the invention to provide a compact, diffraction grating or phased array based optical multiplexer/demultiplexer that is substantially temperature insensitive and which overcomes many of the limitations of prior art devices.

SUMMARY OF THE INVENTION

In accordance with the invention, there is provided, a method of compensating for temperature sensitivity normally associated with a planar waveguide device having a slab waveguiding region having a first temperature coefficient of refractive index, comprising the step of:

providing within the slab waveguiding region a second region having a predetermined shape and predetermined dimensions, the second region having a second different temperature coefficient of refractive index than the first slab region for providing temperature compensation of the device.

In accordance with another aspect of the invention, there is provided an integrated temperature compensated optical waveguide diffraction grating device comprising:

an input region having an input port, an output region having at least a plurality of predetermined light receiving locations, a first slab waveguide region having a first temperature coefficient of refractive index, said slab waveguide region being optically coupled with the input and output regions for partially confining a beam of light launched from the input region between two substantially parallel planes, a diffraction grating disposed to receive a beam of light launched from the input port through the slab waveguide region and to separate the beam into sub-beams of light of different wavelengths to the plurality of predetermined light receiving locations, a second slab waveguide region adjacent to the first slab waveguide region having a predetermined shape and predetermined dimensions, said second slab waveguide region having a second different temperature coefficient of refractive index than the first slab waveguide region for providing temperature compensation of the device.

In accordance with the invention there is provided an optical planar waveguiding light-transmissive device comprising:

an input/output region having an input waveguide and a plurality of predetermined light receiving locations;

a slab waveguide having a first region having a first temperature coefficient of refractive index, said first region being optically coupled with the input/output region for partially confining a beam of light launched from the input region between two parallel planes;

a diffraction grating disposed to receive a beam of light launched from the at least an input waveguide through the slab waveguide and to separate the beam into sub-beams of light of different wavelengths to the plurality of predetermined locations;

a temperature sensitivity offsetting region comprising a different region of the slab waveguide, the temperature sensitivity offsetting region having a predetermined shape and predetermined dimensions and having a different temperature coefficient of refractive index than the first region for at least partially offsetting the temperature sensitivity of the device.

In accordance with the invention there is further provided, an integrated at least substantially temperature compensated optical waveguide grating device comprising:

an input region having an at least an input port, an output region having at least a plurality of predetermined light receiving locations for receiving light from the input region, an input slab waveguide region and an output slab waveguide region each having a predetermined temperature coefficient of refractive index, said input slab waveguide region being optically coupled with the input region for partially confining a beam of light launched from the input region between two parallel planes, said output slab waveguide region being optically coupled with the output region for partially confining a beam of light launched from the input region between two parallel planes, a grating disposed between the input slab waveguide region and the output slab waveguide region to receive a beam of light launched from the at least the input port through the input slab waveguide region and to separate the beam into sub-beams of light of different wavelengths to the plurality of predetermined light receiving locations through the output slab waveguide region, a compensating slab waveguide region between the input port and the output region having a predetermined shape and predetermined dimensions and having a different temperature coefficient of refractive index than the predetermined temperature coefficient of refractive index of at least one of the input and output slab waveguide regions for providing temperature compensation of the device.

In accordance with the invention there is further provided an optical planar waveguiding light-transmissive device comprising:

an input region having an input port and a plurality of predetermined light receiving locations at an output region;

input and output slab waveguide regions each having a predetermined temperature coefficient of refractive index, said input slab waveguide region being optically coupled with the input port for partially confining a beam of light launched from the input port between two parallel planes; said output slab waveguide region being optically coupled with the output locations for partially confining a beam of light launched thereinto between two parallel planes;

a transmissive grating disposed to receive a beam of light launched from the at least an input port and to provide beams to the output slab waveguide for separation into sub-beams of light of different wavelengths to the plurality of predetermined locations;

a temperature compensating region comprising at least a different region of at least one of the slab waveguides, the temperature compensating region having a different temperature coefficient of refractive index than a region of the at least one of the slab waveguides, for offsetting the temperature sensitivity of the device.

This invention provides a convenient method of compensating the temperature sensitivity in grating based wavelength demultiplexers by incorporating a specially shaped area with modified temperature coefficient of refractive index, however the incorporation of this specially shaped area does not alter the size of the grating based multi/demultiplexer. The method of this device can conveniently be applied to a wide range of waveguide structures and material systems.

The device in accordance with the invention can be used to offset temperature sensitivity to various degrees and in some preferred instances can be designed to completely offset temperature sensitivity to completely compensate for the temperature dependence of the device characteristics.

BRIEF DESCRIPTION OF THE DRAWINGS

Exemplary embodiments of the invention, will now be described, in conjunction with the drawings, which.

DETAILED DESCRIPTION

Figure 1:
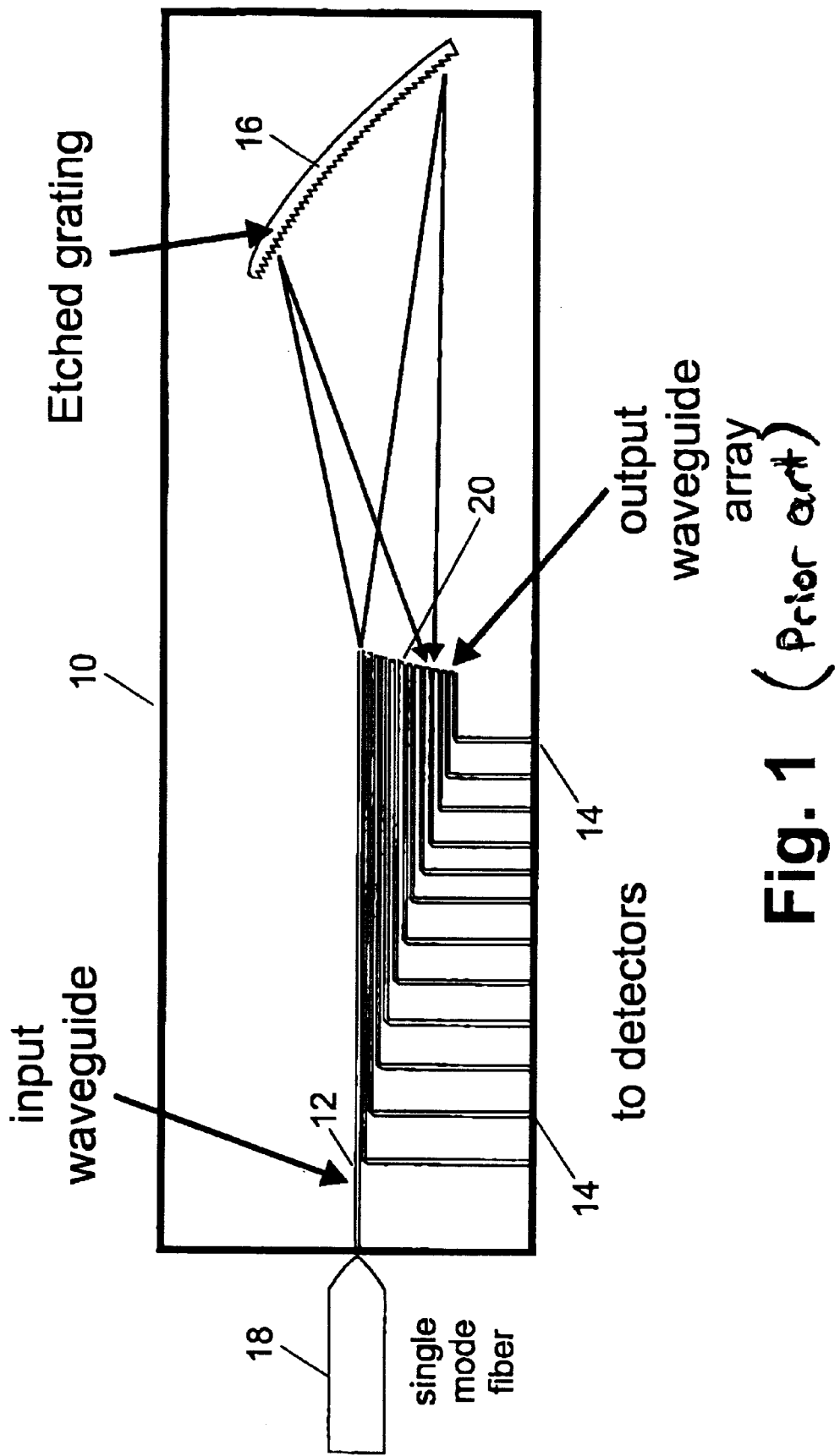
FIG. 1 is a prior art schematic diagram of an integrated waveguide diffraction grating device.
Figure 2:
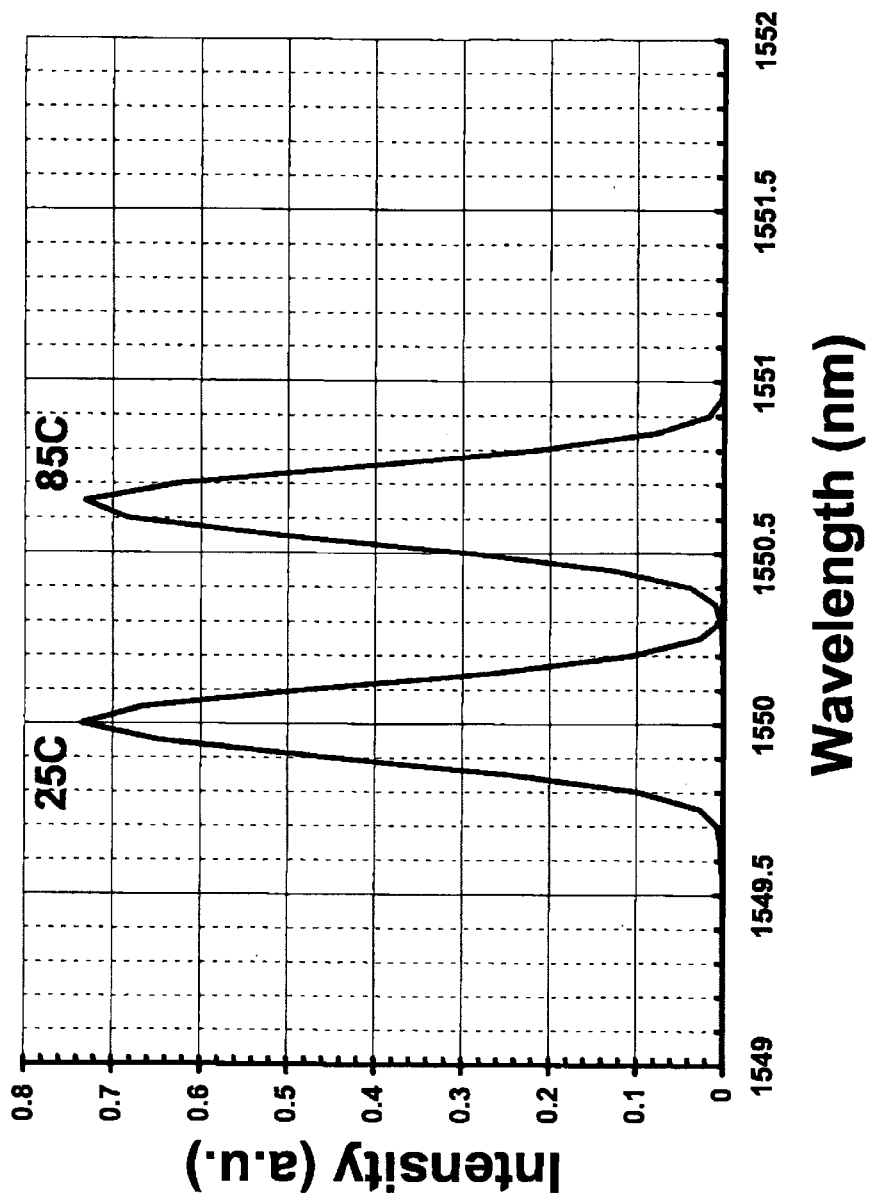
FIG. 2 is a graph of intensity versus wavelength for two different temperatures shown to have their spectrums relatively shifted for the device of FIG. 1.

Referring now to prior art FIG. 1 the schematic of a typical wavelength demultiplexer 10 based on an integrated diffraction grating is shown. It consists of input/output waveguide arrays 12, 14 and an etched diffraction grating 16. The incoming optical signals of different wavelengths are coupled from an optical fiber 18 to an input end of the waveguide of the demultiplexer. At the end of the input waveguide, the light diverges into the slab waveguide and is then focused back to the inputs of the output waveguides by the curved echelle grating. Due to the dispersive property of the diffraction grating 16, light signals of different wavelengths are focused onto different output waveguides. For a given wavelength, the position of the focused spot, for example the location 20, depends on the effective index of the slab waveguide, in addition to geometrical parameters of the grating. Because the effective indice of the slab waveguide varies with the temperature, the focused spot shifts as the temperature changes, resulting in a temperature dependent wavelength shift in the channel response function, as shown in FIG. 2. Here the wavelengths of the response peaks at two different temperatures are shown to be relatively shifted.

The temperature sensitivity is determined by the temperature coefficient of the refractive index $\alpha = dn/dT$ of the waveguide. The wavelength shift is typically of the order of 0.01 nm/° C. in silica based devices and 0.1 nm/° C. in InP based devices. For a temperature variation range of 80° C., the wavelength shift is around 0.8 nm for silica based devices and 8 nm for InP based devices.

Figure 3A:
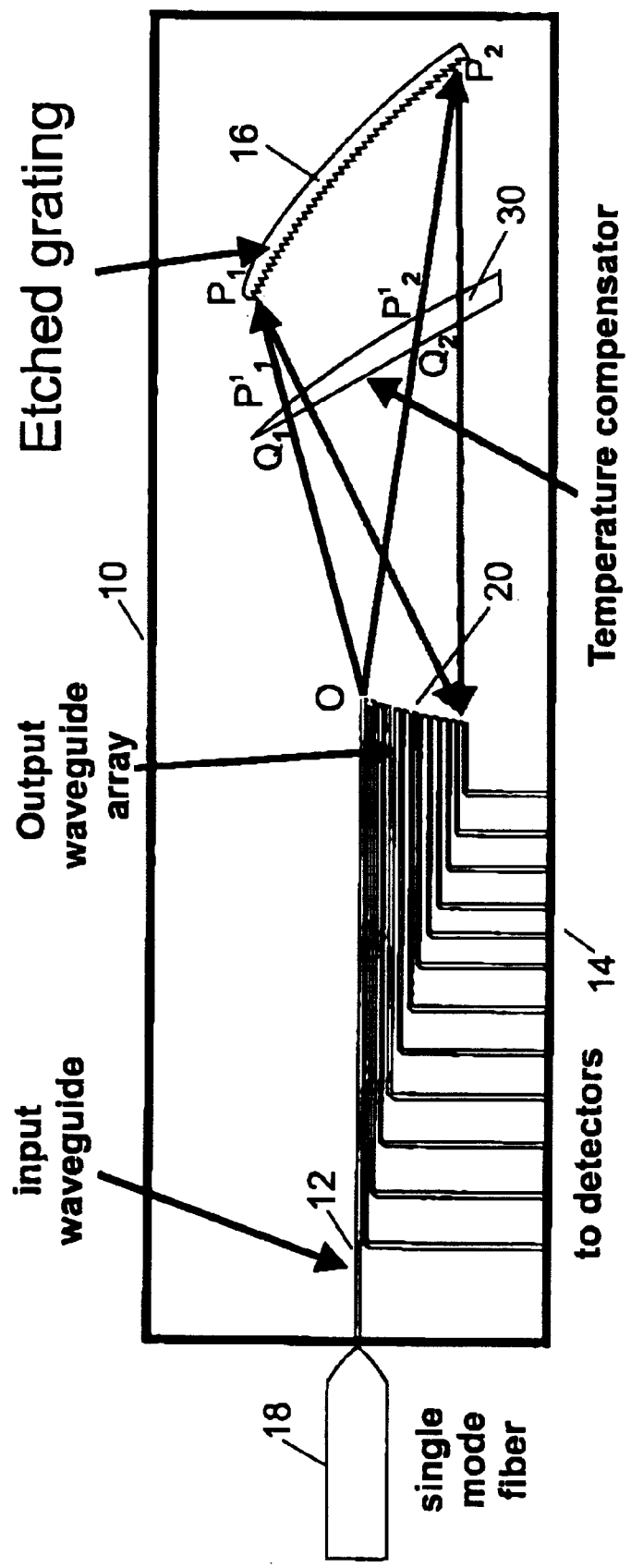
FIG. 3a is a wavelength demultiplexer similar to that of FIG. 1 however having a temperature compensator in accordance with this invention.
Figure 3B:
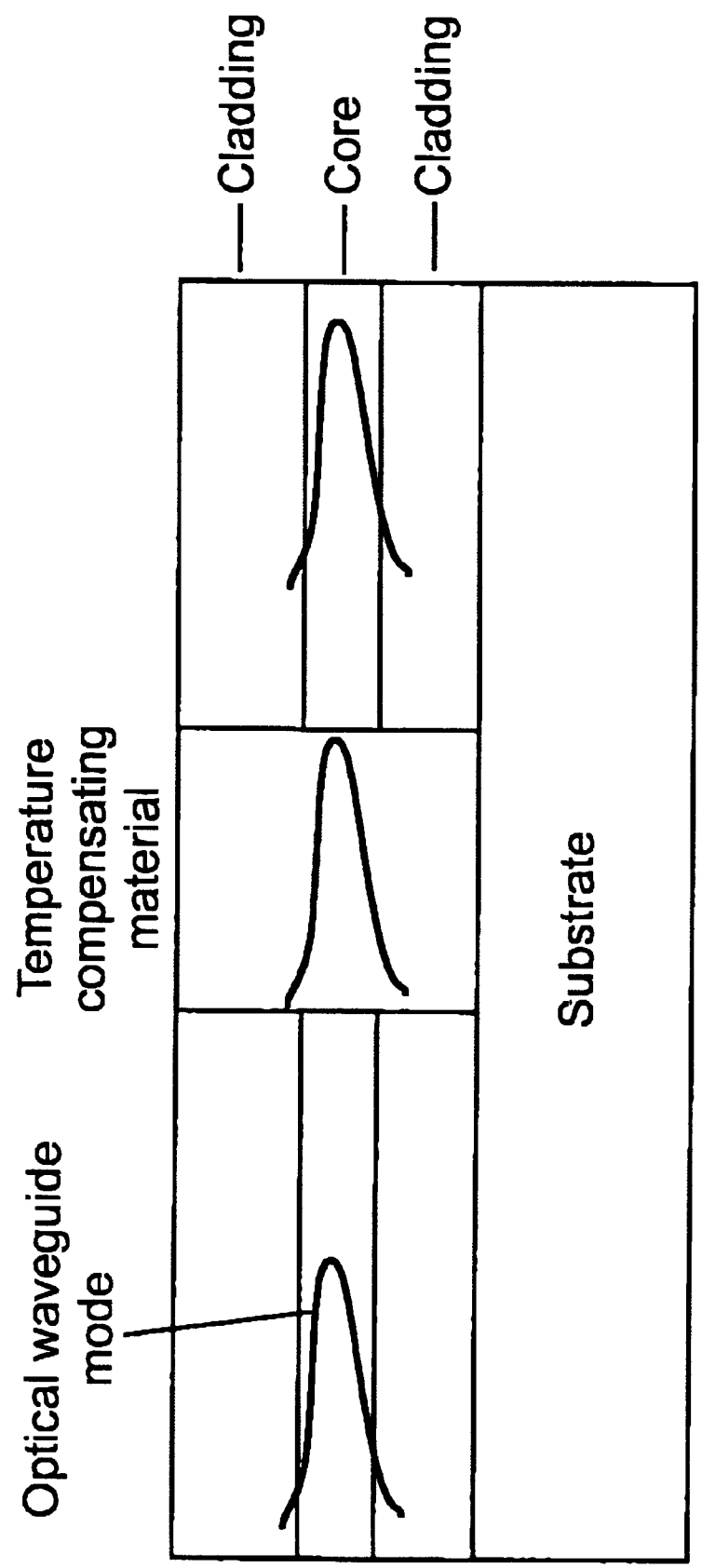
FIG. 3b is a side view in cross section of a portion of the wavelength demultiplexer showing the slab waveguiding region including the temperature compensation region.

A wavelength demultiplexer with a temperature compensator 30 in accordance with this invention is schematically shown in FIG. 3a. A cross-sectional view of the slab waveguide region with the compensator is shown in FIG. 3b. The temperature compensator 30 consists of a region close to the grating. Preferably, the region has a specific shape designed according to the criteria described below. The area has a different temperature coefficient of refractive index. Its shape is determined by $$\delta L_p = \Delta L_p \bigg/ \left(1 - \frac{\alpha'}{\alpha}\right),$$

where the total path length difference $\Delta L_p = \overline{OP_2} - \overline{OP_1}$ with the point O being the end of the input waveguide, $P_1$ and $P_2$, any given two points on the grating; $\delta L_p = \overline{Q_2 P_2'} - \overline{Q_1 P_1'}$ is the corresponding path length difference measured within the compensator boundary.

Simulation results have revealed that such designed compensator can completely or at least substantially eliminate the temperature dependent wavelength shift of the demultiplexer. The physical principle governing the temperature compensator 30 can be understood as following. In a conventional demultiplexer such as the one in FIG. 1, the wavelength of the signal that is received by a given output waveguide must satisfy $$\Delta\Phi \approx 4\pi n \Delta L_p / \lambda = 2m N \pi \tag{1}$$

where $\Delta\Phi$ is the phase difference between the light reflected by the grating facets at point A and point P, $\lambda$ the wave vector in the vacuum, n the effective index of the slab waveguide, m the order of the grating and N the number of grating periods between A and P. This leads to the following relation between the temperature dependent wavelength shift and the temperature coefficient of refractive index:

$$\frac{d\lambda}{dT} = \frac{\lambda}{n}\frac{dn}{dT} = \frac{\alpha\lambda}{n} \tag{2}$$

After the inclusion of the compensator, the $\Delta\Phi$ condition can be written as $$\Delta\Phi \approx 4\pi[n\Delta L_p + (n'-n)\delta L_p]/\lambda = 2m N \pi \tag{3}$$

where n' is the effective index of the temperature compensator region. The temperature dependent wavelength shift becomes $$\frac{d\lambda}{dT} = \frac{\alpha\Delta L_p + (\alpha'-\alpha)\delta L_p}{n\Delta L_p + (n'-n)\delta L_p}\lambda \tag{4}$$

The condition for temperature insensitivity, i.e.

$$\frac{d\lambda}{dT} = 0,$$

can then be obtained by $$\alpha\Delta L_p + (\alpha'-\alpha)\delta L_p = 0 \tag{5}$$

that is $$\delta L_p = \Delta L_p \bigg/ \left(1 - \frac{\alpha'}{\alpha}\right) \tag{6}$$

Since the optical path length change due to the temperature compensator is very small, Eq. (4) can be approximately rewritten as $$\frac{d\lambda}{dT} \approx \frac{\alpha\Delta L_p + (\alpha'-\alpha)\delta L_p}{n\Delta L_p}\lambda = \left(\frac{\alpha}{n} + \frac{\alpha'-\alpha}{n}\cdot\gamma\right)\lambda \tag{7}$$

where we have defined the parameter $$\gamma = \frac{\delta L_p}{\Delta L_p}.$$

Therefore, we can also control the temperature sensitivity to any degree by adjusting the $\gamma$ value.

As an example, in a silica based waveguide structure, the temperature coefficient of the silica slab waveguide is $\alpha = 1 \times 10^{-5}$ (1/° C.). Using silicone adhesive in the compensating region, the temperature coefficient of refractive index is $\alpha = -37 \times 10^{-5}$ (1/° C.). The temperature compensation condition gives $$\gamma = \frac{\delta L_p}{\Delta L_p} = \frac{1}{38}.$$

Figure 4:
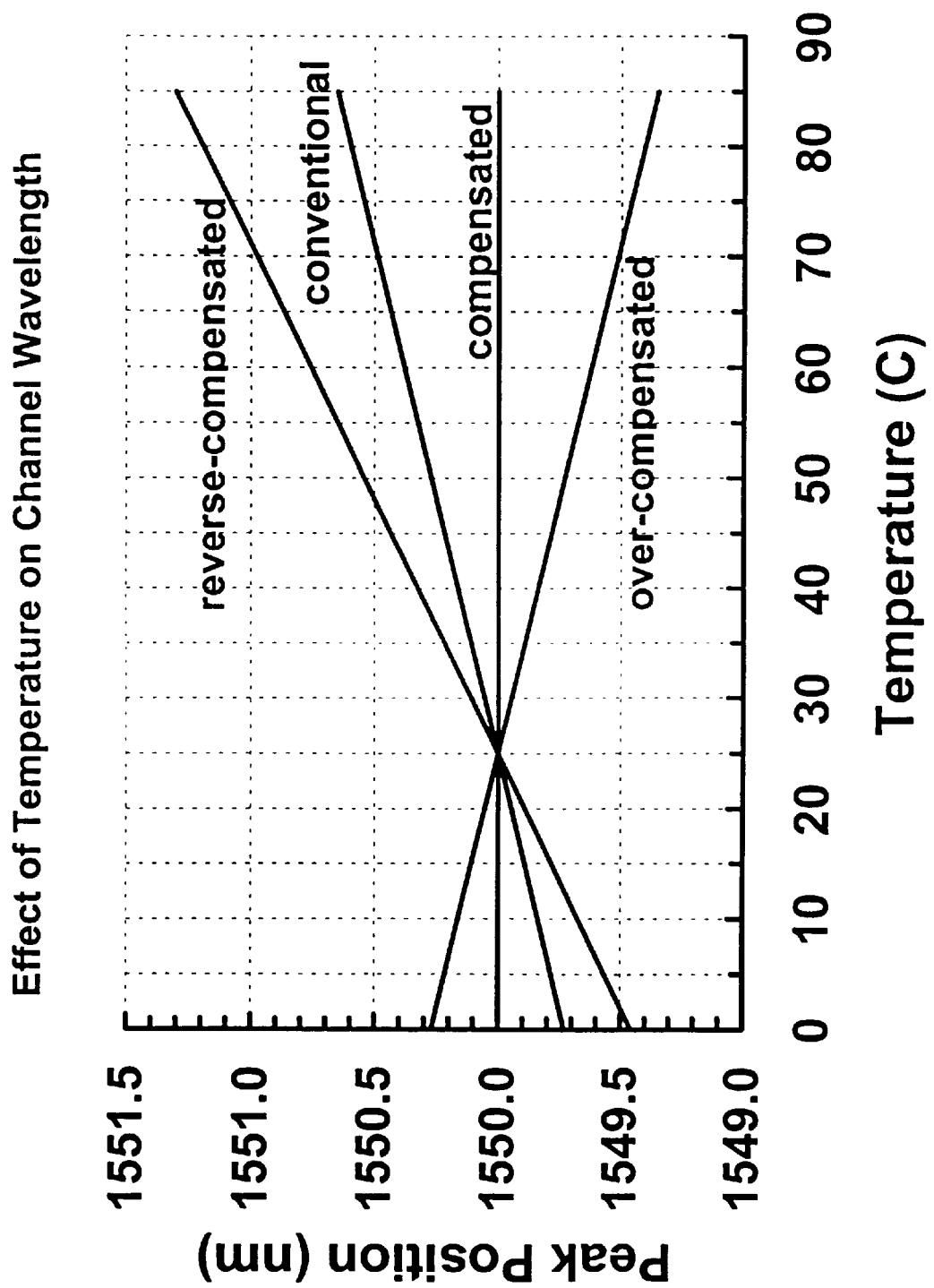
FIG. 4 is a graph of a channel wavelength versus temperature for different degrees of temperature compensation.

FIG. 4 shows the calculated variation of a channel wavelength as a function of the temperature, for different degrees of temperature compensation corresponding to $\gamma=0$ (conventional, no compensation), $\gamma=1/38$ (compensated), $\gamma=1/19$ (over-compensated), and $\gamma=-1/38$ (reverse compensated). It can be seen that when there is no compensation, the channel wavelength shift is about 0.9 nm for 80° C. of temperature variation. For the compensated device, the channel wavelength does not change with the temperature. The temperature sensitivity increases with the reverse compensated device and can change to negative sign in the over-compensated case.

It should be noted that, although the modeling was related to silica waveguide structures and silicone adhesive was used for the compensating region, the principle of the temperature compensator in accordance with this invention can be applied to other material systems such as semiconductor and plastic waveguides. Techniques other than etching and refilling for achieving a temperature coefficient difference can also be used, such as etching and regrowth of the waveguide core layer followed by an overgrowth of the top cladding layer, and quantum well intermixing techniques for devices comprising a semiconductor quantum well material, in order to modify the temperature coefficient of refractive index.

The term offset used in this specification shall mean changing the temperature coefficient of refractive index of a region so as to control the amount of temperature sensitivity exhibited by the device.

Figure 5:
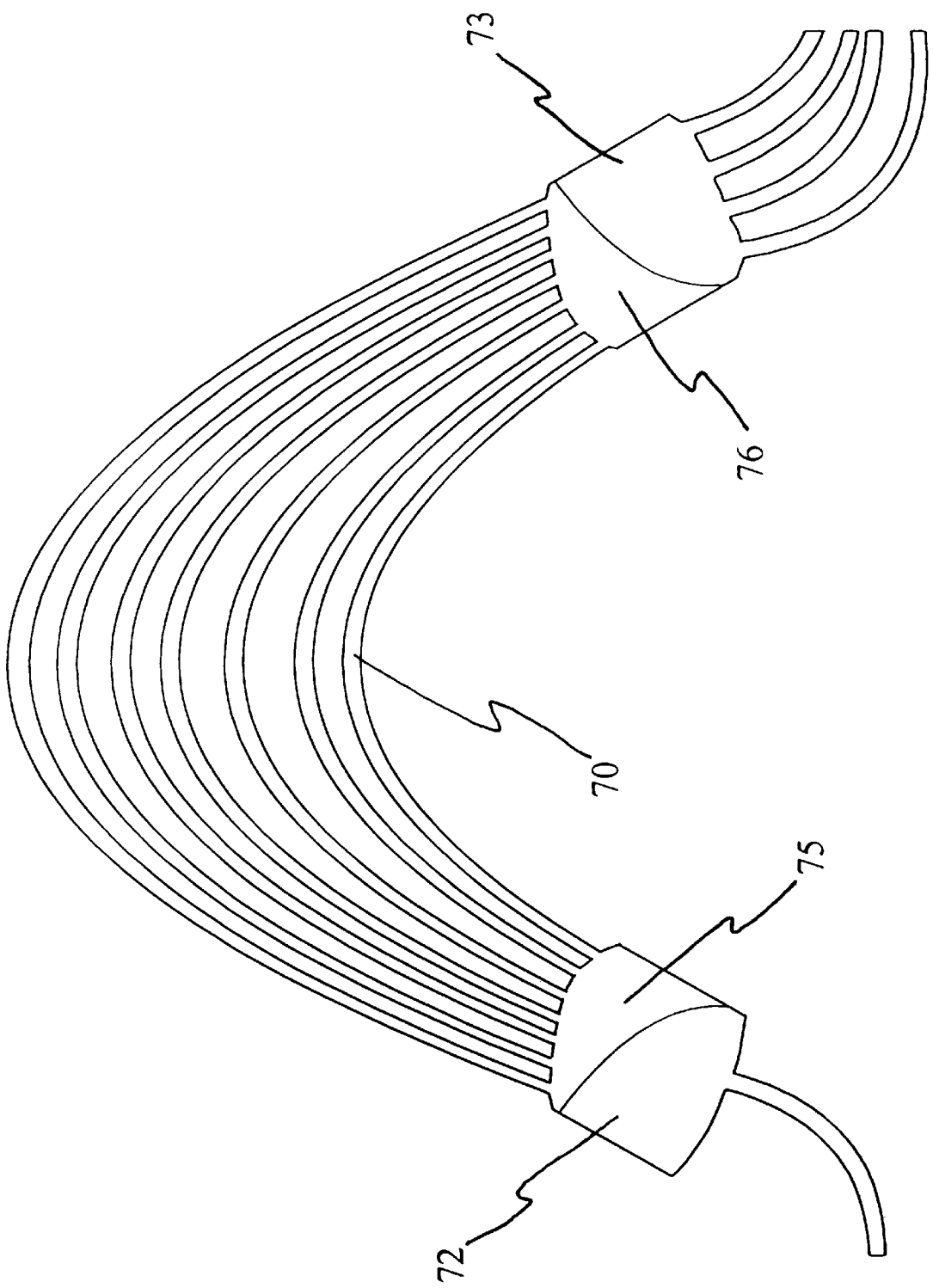
FIG. 5 is a top view of a phased array waveguide demultiplexer having two temperature compensation regions.

The provision of a compensation region within a slab waveguide to offset or compensate for temperature effects can also be used for devices based on transmissive diffraction gratings such as phased array waveguide gratings, or ruled gratings having a planar slab waveguiding region. In these instances, the temperature compensation region can be disposed either between the input port and the grating element, or between the grating element and the output region or both, as shown in FIG. 5. In the case of the phased array, in particular, this method has the advantage of not disturbing the optical confinement in the arrayed waveguides, thus reducing the loss and crosstalk, compared to prior art devices such as the one described by Y. Inoue, A. Kaneko, F. Hanawa, H. Takahashi, K. Hattori, and S. Sumida, in a paper entitled "Athermal silica-Based arrayed waveguide grating demultiplexers", *Electron. Lett.* 33, PP. 1945–46, 1997.

Turning now to FIG. 5, planar slab waveguide regions 72 and 73 are shown having an array of waveguides 70 of different lengths disposed therebetween. In this embodiment, triangular-like temperature compensation regions 75 and 76 are provided. These regions may conveniently be etched and regrown or other means may be used to alter the temperature coefficient of refractive index of the regions 72 and/or 73.

This invention provides a convenient method of compensating the temperature sensitivity in grating based wavelength demultiplexers by incorporating a specially shaped area with modified temperature coefficient of refractive index. It can be applied to a wide range of waveguide structures and material systems. By using etching and regrowth of the waveguide core layer followed by an overgrowth of the top cladding layer, or by using quantum well intermixing techniques for devices comprising a semiconductor quantum well material, the vertical waveguide confinement can also be maintained in the compensating region. Therefore, the method and device of this invention can eliminate the temperature sensitivity of the device without increasing the loss and crosstalk. It is therefore believed to be preferable to all other methods reported in the literature for temperature compensation.

Of course numerous other embodiments may be envisaged. For example, this technique can also be used to control the temperature sensitivity to any degree, thus making devices useful for other applications requiring control of the temperature sensitivity.

What is claimed is:

1. An integrated temperature compensated optical waveguide diffraction grating device comprising:

an input region having an input port, an output region having at least a plurality of predetermined light receiving locations, a first slab waveguide region having a first temperature coefficient of refractive index, said slab waveguide region being optically coupled with the input and output regions for partially confining a beam of light launched from the input region between two substantially parallel planes, a diffraction grating disposed to receive a beam of light launched from the input port through the slab waveguide region and to separate the beam into sub-beams of light of different wavelengths to the plurality of predetermined light receiving locations, a second slab waveguide region adjacent to the first slab waveguide region having a predetermined shape and predetermined dimensions, said second slab waveguide region, which constitutes a temperature compensation region, having a second different temperature coefficient of refractive index than the first slab waveguide region for providing temperature compensation of the device.

2. An integrated temperature compensated optical waveguide diffraction grating device as defined in claim 1, wherein the dimension of the second slab waveguide region and the ratio of the first temperature coefficient of refractive index and the second temperature coefficient of refractive index are selected so as to provide a temperature independent optical path length that light traverses propagating from the input waveguide to at least one of the plurality of output locations.

3. An integrated temperature compensated optical waveguide diffraction grating device as defined in claim 2, wherein the shape of the second slab waveguide region is substantially triangular.

4. An integrated temperature compensated optical waveguide diffraction grating device as defined in claim 3 wherein the path length of any two rays of light launched from the input port toward the diffraction grating at two different locations will each traverse the second slab waveguide region along two different lines, the shape and dimensions of the second slab waveguide region being such that the length of the two different lines through the second slab waveguide region are different.

5. An integrated temperature compensated optical waveguide diffraction grating device as defined in claim 1 wherein the temperature compensation region is formed by etching a region, proximate to the grating, the etched region being filled with a material having temperature coefficient of refractive index α', the first region of the waveguide having a temperature coefficient of refractive index of α, the etched region having a first boundary that is substantially coincident with a curve parallel and proximate to the grating on one side and said etched region having a second boundary curve AB on the other side that is substantially determined by $$\delta L_p = \Delta L_p / \left(1 - \frac{\alpha'}{\alpha}\right),$$

where the total path length difference $\Delta L_p = \overline{OP_2} - \overline{OP_1}$ with the point O being the end of the input waveguide, and the points $P_1$ and $P_2$ being any given two points on the grating; and wherein $\delta L_p = \overline{Q_2 P_2 40} - \overline{Q_1 P'_1}$ is the corresponding path length difference measured within the compensator boundary, wherein for a different value of $\Delta L_p$ a different value of $\delta L_p$ results.

6. An integrated temperature compensated optical waveguide diffraction grating device as defined in claim 1 wherein the temperature compensation region is formed by etching and regrowth of the waveguide core layer followed by overgrowth of the top cladding layer.

7. An integrated temperature compensated optical waveguide diffraction grating device as defined in claim 1 wherein the device comprises a semiconductor quantum well material and the temperature compensation region is formed by using a quantum well intermixing technique.

8. An optical planar waveguiding light-transmissive device comprising:
   an input/output region having an input waveguide and a plurality of predetermined light receiving locations;
   a slab waveguide having a first region having a first temperature coefficient of refractive index, said first region being optically coupled with the input/output region for partially confining a beam of light launched from the input region between two parallel planes;
   a diffraction grating disposed to receive a beam of light launched from the at least an input waveguide through the slab waveguide and to separate the beam into sub-beams of light of different wavelengths to the plurality of predetermined locations;
   a temperature sensitivity offsetting region comprising a different region of the slab waveguide, the temperature sensitivity offsetting region having a predetermined shape and predetermined dimensions and having a different temperature coefficient of refractive index than the first region for at least partially offsetting the temperature sensitivity of the device.

9. An optical planar waveguiding light-transmissive device as defined in claim 8 wherein he temperature sensitivity offsetting region is formed by etching a portion of the first slab waveguide region to a predetermined thickness, and then filling the etched region with a material of a different temperature coefficient of refractive index.

10. An optical planar waveguiding light-transmissive device as defined in claim 8, wherein the path length of any two rays of light launched from the input waveguide toward the grating at two different locations will each traverse the temperature compensation region along two different lines, the shape and dimensions of the temperature compensation region being such that the length of the two different lines through the temperature compensation region are different.

11. An optical planar waveguiding light-transmissive device as defined in claim 8 wherein wherein the first region is a silica based waveguide and the temperature sensitivity offsetting region comprises a silicone adhesive.

12. An optical planar waveguiding light-transmissive device as defined in claim 8 wherein the device comprises a semiconductor material.

13. An integrated at least substantially temperature compensated optical waveguide grating device comprising:
    an input region having at least an input port,
    an output region having at least a plurality of predetermined light receiving locations for receiving light from the input region,
    an input slab waveguide region and an output slab waveguide region each having a predetermined temperature coefficient of refractive index, said input slab waveguide region being optically coupled with the input region for partially confining a beam of light launched from the input region between two parallel planes, said output slab waveguide region being optically coupled with the output region for partially confining a beam of light launched from the input region between two parallel planes,
    a grating disposed between the input slab waveguide region and the output slab waveguide region to receive a beam of light launched from the at least the input port through the input slab waveguide region and to separate the beam into sub-beams of light of different wavelengths to the plurality of predetermined light receiving locations through the output slab waveguide region,
    a compensating slab waveguide region between the input port and the output region having a predetermined shape and predetermined dimensions and having a different temperature coefficient of refractive index than the predetermined temperature coefficient of refractive index of at least one of the input and output slab waveguide regions for providing temperature compensation of the device.

14. An integrated at least substantially temperature compensated optical waveguide grating device as defined in claim 13, wherein the dimension and temperature coefficient of refractive index of the compensating slab waveguide region are selected so as to provide a temperature independent optical path length that light traverses propagating from the input port to at least one of the plurality of output locations.

15. An integrated at least substantially temperature compensated optical waveguide grating device as defined in claim 13, wherein the grating is a phased waveguide arrayed grating comprising an array of waveguides disposed between the input slab waveguide region and the output slab waveguide region.

16. An integrated at least substantially temperature compensated optical waveguide grating device as defined in claim 15 wherein the compensating slab waveguide region is disposed between at least one of the input region and the phased array waveguide grating and the output region and the phased array waveguide region.

17. A device as defined in claim 15 wherein the device is comprised of a dielectric material.

18. An optical planar waveguiding light-transmissive device comprising:
    an input region having an input port and a plurality of predetermined light receiving locations at an output region;
    input and output slab waveguide regions each having a predetermined temperature coefficient of refractive index, said input slab waveguide region being optically coupled with the input port for partially confining a beam of light launched from the input port between two parallel planes; said output slab waveguide region being optically coupled with the output locations for partially confining a beam of light launched thereinto between two parallel planes;

a transmissive grating disposed to receive a beam of light launched from the at least an input port and to provide beams to the output slab waveguide for separation into sub-beams of light of different wavelengths to the plurality of predetermined locations;

a temperature sensitivity offsetting region comprising at least a different region of at least one of the slab waveguides, the temperature sensitivity offsetting region having a different temperature coefficient of refractive index or being able to exhibit a different temperature coefficient of refractive index than a region of the at least one of the slab waveguides, for offsetting the temperature sensitivity of the device.

19. A device as defined in claim 18, wherein the temperature sensitivity offsetting region is of a predetermined shape and size.

20. A device as defined in claim 18, wherein the temperature sensitivity offsetting region comprises a portion of the input slab waveguide.

21. A device as defined in claim 18, wherein the temperature sensitivity offsetting region comprises a portion of the output slab waveguide.

22. A device as defined in claim 18, comprising a second temperature sensitivity offsetting region, one of the temperature sensitivity offsetting regions comprising a portion of the input slab waveguide and the other of the offsetting regions comprising a portion of the output slab waveguide.

23. A device as defined in claim 18, wherein the grating is a phased array grating comprising an array of waveguides having different optical path lengths.

* * * * *